United States Patent [19]

Ikeda et al.

[11] Patent Number: 4,633,842
[45] Date of Patent: Jan. 6, 1987

[54] METHOD AND APPARATUS FOR CONTROLLING THE FUEL INJECTION AMOUNT AND TIMING FOR A DIESEL ENGINE

[75] Inventors: Shinji Ikeda; Shinichi Matsumoto, both of Susono, Japan

[73] Assignee: Toyota Jidosha Kabushiki Kaisha, Toyota, Japan

[21] Appl. No.: 609,183

[22] Filed: May 11, 1984

[30] Foreign Application Priority Data

May 24, 1983 [JP] Japan ................................. 58-91334

[51] Int. Cl.$^4$ ............................................ F02M 39/00
[52] U.S. Cl. .................................... 123/501; 123/357; 123/494
[58] Field of Search ............... 123/501, 500, 357, 358, 123/359, 494

[56] References Cited

U.S. PATENT DOCUMENTS

| | | | |
|---|---|---|---|
| 4,397,283 | 8/1983 | Komaroff | 123/501 |
| 4,426,969 | 1/1984 | Eheim | 123/357 |
| 4,463,229 | 8/1984 | Bullis | 123/501 |
| 4,463,733 | 8/1984 | Tsai | 123/501 |

Primary Examiner—Carl Stuart Miller
Attorney, Agent, or Firm—Finnegan, Henderson, Farabow, Garrett & Dunner

[57] ABSTRACT

A method for controlling the fuel injection amount and timing for a Diesel engine by use of an electronic control unit having a CPU, a ROM, and a RAM in which the data corresponding to the steps of the method according to present invention have been preliminarily stored in the ROM, the steps Principally comprising: (i) detecting the engine speed, (ii) calculating a basic maximum fuel injection amount in accordance with the engine speed sought in the above step, (iii) detecting the intensity of the burning flame light in the combustion chamber of the engine, (iv) and correcting the basic maximum fuel injection amount calculated in the above step in accordance with the intensity of the burning flame light sought in the previous step. With this construction of the method and apparatus according to the present invention, optimum fuel injection amount and timing control can be realized in accordance with the change in altitude and/or the change in atmospheric pressure, i.e. environmental conditions, thus reducing black smoke, knockings, noises and also enabling the fuel consumption rate to be reduced.

7 Claims, 13 Drawing Figures

METHOD AND APPARATUS FOR CONTROLLING THE FUEL INJECTION AMOUNT AND TIMING FOR A DIESEL ENGINE

BACKGROUND OF THE INVENTION (1) Field of the Invention

The present invention relates to method and apparatus for controlling the fuel injection amount and timing for a Diesel engine and more particularly to a method of controlling the fuel injection amount and timing for a Diesel engine during the running environment where the change in altitude and/or the change in atmospheric pressure occurs.

(2) Description of the Prior Art

In the diesel engine according to the prior art, when operating the engine, maximum fuel injection amount is determined in accordance with the engine speed and excessive fuel injection by the operation of an accelerator pedal can be prevented, thus in turn preventing black smoke from being generated.

However, in the environment where the atmospheric pressure is low such as at high elevations, the similar control for the Diesel engine as in the case of low geographical places or normal environmental places caused the black smoke to be generated in the engine operating or running at high elevations.

In order to overcome the problem mentioned above, a correction was made so as to reduce the maximum fuel injection amount which was an upper limit of the fuel injection amount at high elevations by using an atmospheric pressure sensor which changes its output in accordance with the atmospheric pressure One of the shortcomings of the atmospheric pressure sensor was that because of its method of operation which involved measuring the amount of a mechanical displacement due to the difference between atmospheric pressures inside and outside of a measuring unit such as a diaphragm valve, with the result that a relatively large space is required for it. Moreover, in the technique according to the prior art, not only is the measuring accuracy insufficient but also the mechanical portions and mechanically operating portions were often subject to troubles and failures.

In the intake or suction air pressure sensor of a semiconductor strain gauge type for detecting air pressure, which is proportional to the atmospheric pressure, there were problems such as securing sufficient mounting space without complicating the unit low durability good and the cost of the unit became expensive. and high cost mechanically operating portions but having a long durability and a relatively simple construction has been desired heretofore. Moreover, an atmospheric pressure measuring unit which can be commonly used as other measuring units that is also light in weight and small enough to carry on a car has been desired.

(3) Summary of the Invention

It is therefore an object of the present invention to provide a method of controlling the fuel injection amount and timing for a Diesel engine in which parameters concerning atmospheric pressure or intake air pressure are measured without using the conventional atmospheric pressure sensor or an intake air pressure sensor.

It is another object of the present invention to provide a method of controlling the fuel injection amount and timing for a Diesel engine so as to control maximum fuel injection amount to cylinders of the engine in accordance with the engine speed in which the burning flame light in a combustion chamber of the cylinder is detected by a flame sensor and maximum fuel injection amount is increased and decreased in accordance with the intensity of the burning flame light.

It is further object of the present invention to provide a method of controlling the fuel injection amount and timing for a Diesel engine in which the method comprises the steps of detecting the engine speed, calculating a basic maximum fuel injection amount in accordance with the engine speed sought in the first step, detecting the intensity of the burning flame light in the combustion chamber of the engine, and correcting the basic maximum fuel injection amount calculated in the second step in accordance with the intensity of the burning flame light sought in the third step.

It is still another object of the present invention to provide an apparatus for controlling the fuel injection amount and timing for a Diesel engine in which an electronic control unit having a CPU, a ROM, and a RAM is utilized and an actuator and control valves such as spill actuator and fuel cut valve and timer control valve are controlled in accordance with detected signals by a plurality of sensors including a flame sensor and specific control programs for realizing the method according to the present invention.

It is yet still another object of the present invention to provide an apparatus for controlling the fuel injection amount and timing for a Diesel engine in which a peak hold circuit for holding the peak value of the detected signal from the flame sensor is provided in the electronic control unit.

One feature of the present invention resides in the method of controlling the fuel injection amount and timing for a Diesel engine which comprises the steps of: detecting the engine speed NE by an engine speed sensor; retrieving a basic maximum fuel injection amount $Q_0$ from a data map stored in a memory in accordance with the engine speed NE; determining whether or not the content of a counter i is above a predetermined count n in accordance with the result of said retrieval; detecting the intensity of the burning flame light by the flame sensor and the peak value F(i) from the nth burning flame light and calculating the total $F_p$ of the peak values; calculating the mean value $\bar{F}_P = F_p/n$ and seeking the correction factor $Q_d$ for the basic maximum fuel injection amount in accordance with the function $f(F_p)$ from the result of said determination; seeking a final maximum fuel injection amount $Q_f$ by the calculation of $Q_f = Q_0 - Q_d$; and calculating the duty of a first control signal to be applied to a spill actuator and a fuel cut valve in a fuel injection pump so as to control the optimum fuel injection amount in accordance with the $Q_f$ thus calculated.

Another feature of the present invention resides in the apparatus for controlling the fuel injection amount and timing for a Diesel engine having an fuel injection pump which comprises: a plurality of sensors including a burning flame sensor for detecting the burning flame light, the accelerator opening and the engine speed, etc. and for producing different detected signals , respectively; a spill actuator provided in the fuel injection pump and for controlling the fuel injection amount in accordance with the detected signals; a fuel cut valve provided at the fuel injection pump and for cutting the supply of fuel into the cylinder of the engine; a timer control valve provided at a conduit communicating high and low pressure oil chambers of the fuel injection pump and for controlling a timer so as to adjust the fuel injection timing ; an electronic control unit comprising: (i) a CPU for receiving various data and the detected signals from said sensors and for performing various operations and calculations of these data and signals and for producing control signals to said spill actuator, to said fuel cut valve, and to said timer control valve in accordance with control programs and said detected signals; (ii) a ROM for preliminarily storing various data maps and said control programs for controlling the operations of said CPU; and (iii) a RAM for temporarily storing data corresponding to said detected signals by said sensors; thereby controlling the fuel injection amount and timing through said spill actuator, said fuel cut valve, and said timer control valve in accordance with the detected signals and the control programs.

These and other objects, features, and advantages of the invention will be apparent from the following detailed description with reference to the attached drawings.

DESCRIPTION OF THE PREFERRED EMBODIMENT

Figure 1:
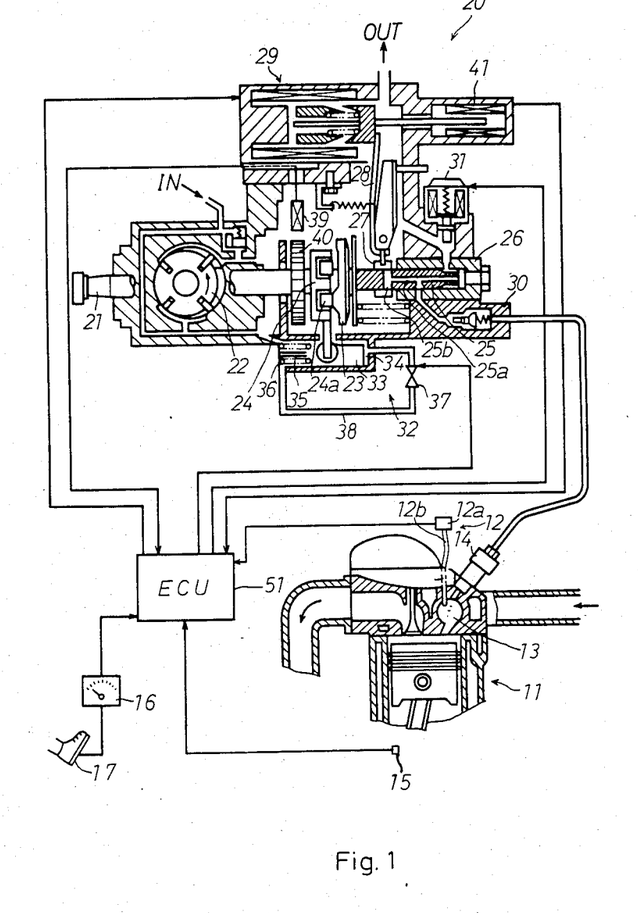
FIG. 1 is an overall engine system having a fuel injection pump to which the method and apparatus according to the present invention are applied.

Referring to FIG. 1 an engine system and its associated peripheral units and components are shown to which the method and apparatus according to the present invention are applied. In the figure, the engine system comprises a Diesel engine 11, a flame sensor 12 mounted to the cylinder of the engine 11 with the extreme end thereof exposed in a combustion chamber 13 so as to pick up the burning flame light of the fuel in the chamber 13 and to guide the light to a light detection circuit 12a through a light guide or an optical fiber 12b.

Figure 3:
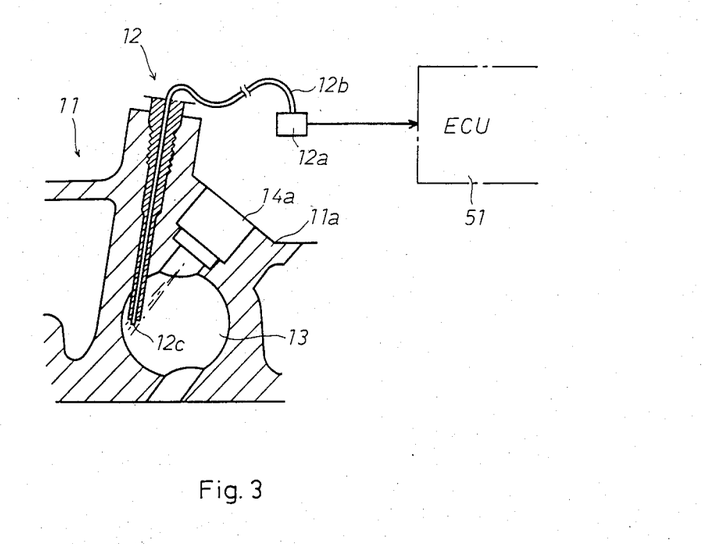
FIG. 3 is a partially enlarged sectional view of the engine and the flame sensor shown in FIG. 1 and FIG. 2, in the mounted condition at the engine.

The engine system also comprises a fuel injection valve 14 for injecting fuel into the combustion chamber 13, a TDC sensor 15 for detecting the time point of the piston of the engine being in the TDC position. The combustion chamber 13 may be an air type chamber or precombustion type chamber other than the vortex type chamber as shown in FIG. 3, the details of which will be described later. The reference numeral 16 shows an accelerator opening sensor coupled to an accelerator pedal 17 and for producing an analog output signal in accordance with the amount of the depression of the pedal 17.

The well known fuel injection pump generally indicated at 20 which is electronically controlled distribution type comprises generally a drive shaft 21 which is rotatably driven by the engine 11, a feed pump 22 driven by the drive shaft and for suctioning the fuel into the pump chamber, a cam plate 23, a rotating member 24 which is contactive with the cam face of the cam plate and having a roller 24a so as to pivotally rotate it in accordance with the displacement of a piston, a pump plunger 25 inserted within a cylinder 26 and rotatably driven by the drive shaft 21 and for performing a piston movement by the interaction of the cam plate 23 and the roller 24a.

To the pump plunger 25, there is formed a shaft hole 25a of the plunger and a spill port 25b which communicates with the shaft hole 25a. Also, to the periphery of the pump plunger 25, there is slidably provided a spill ring 27 which is interlocked with a spill actuator 29 of a linear solenoid type through a governor lever 28, the position of which is controlled in accordance with the optimum fuel injection amount calculated in a control unit 51 which will be described in detail later. The fuel injection amount is controlled by adjusting the timing of the fuel flow.

The fuel injection pump 20 also comprises a delivery valve 30 for supplying the pressurized fuel from the distribution port of the pump plunger 25 to the fuel injection valve 14, a fuel cut valve 31 for stopping or cutting the supply of the fuel to the cylinder 26, a timer cam 32 of a hydroric type for adjusting the fuel injection timing in such a manner that the pivotal movement of the rotating member 24 in the circumferential direction which gets into contact with the cam plate 23 is controlled by the movements of a piston timer 33, thus enabling the fuel injection timing to be adjusted. Here, the timer 32 is indicated at 90° developed condition.

Within the cylinder into which the timer piston 33 is inserted, there is formed a high pressure oil chamber 34 and a low pressure oil chamber 35 at both the front and rear edge sides of the timer piston 33. A coil spring 36 is inserted in the low pressure oil chamber 35 and a conduit 38 having a timer control valve 37 communicates the high pressure oil chamber 34 with the low pressure oil chamber 35. Accordingly, the timer control valve 37 which operates in response to the duty ratio of a control pulse signal of, for instance, 20 HZ permits the pressurized oil in the high pressure chamber 34 to be leaked into the low pressure oil chamber 35 in accordance with the duty ratio of the signal, thus enabling the position of the timer piston 33, i.e. the position of the pivotal movement of the rotating member 24 to come to the position where the oil pressure in the high pressure oil chamber 34 and in the low pressure oil chamber 35 as well as the force of the spring 36 balance each other.

Furthermore, in FIG. 1, a gear speed sensor 39 of a magnetic pick-up type is provided at a gear 40 of the fuel injection pump 20 so as to produce pulse signals in accordance with the rotating speed of the gear 40. A spill sensor 41 is also provided in the fuel injection pump 20. The control unit 51 receives various data corresponding to the detected signals from the flame sensor 12, the TDC sensor 15, the accelerator opening sensor 16, the engine speed sensor 39 and the spill position sensor 41, etc., operates and processes these data and controls the spill actuator 29, the fuel cut valve 31, and the timer control valve 37 etc., in accordance with the result of the operations and calculations.

Figure 2:
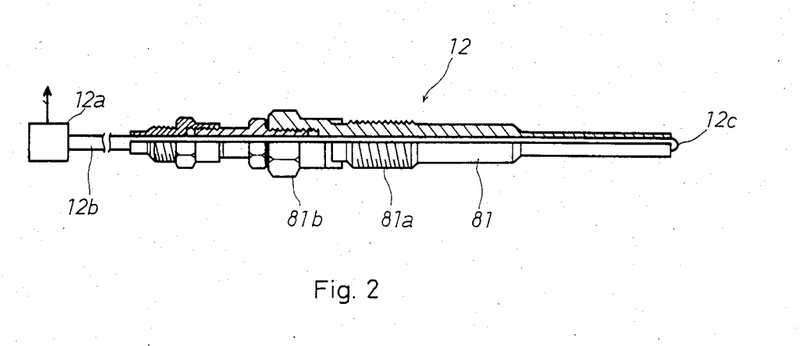
FIG. 2 is one example of the construction of a flame sensor for use in the present invention in order to detect the burning flame light in the combustion chamber of a cylinder.

FIG. 2 shows one example of the flame sensor 12 which has a cylindrical housing 81. The outer circumferential face of housing 81 has a threading 81a and a hexagonal head portion 81b for being screwed in the cylinder of the engine. The cylindrical housing 81 has a central hole through which an optical fiber 12b made of quartz glass is penetrated. The end 12c of this flame sensor 12 is projected out of the cylindrical housing 81 and formed as a lens for easy detection of light, and the other end is provided with a light detecting circuit 12a which uses a phototransistor, photodiode or solar cell to detects the light and converts it into an electric signal.

As shown in FIG. 3, which is an enlarged sectional view of the engine, the flame sensor 12 is mounted in such a manner that the end of 12c of the flame sensor 12 is exposed in the chamber 13 in the cylinder head 11a which is a portion of the cylinder of the engine 11. In order to guide the burning flame light out of the cylinder head 11a through the cylindrical housing 81, the optical fiber 12b is connected to the light detecting circuit 12a. The light from the burning flame in the chamber 13 reaches the light detecting circuit 12a via the optical fiber 12b where it is converted into an electric signal and delivered to the electronic control unit 51. The reference numeral 14a indicates the nozzle of the fuel injection valve 14, which is arranged in such a manner that the fuel injected from the nozzle nearly hits the end 12c of the flame sensor 12. Because of this arrangement of the nozzle, the end 12c is washed by the fuel and so it is not easily stained.

The optical fiber in the cylindrical housing 81 and that to the photodetector circuit 12a may be separately arranged. In this case, both these optical fibers should be integrally connected by welding, etc. at the time of mounting the flame sensor to the engine 11.

Figure 4:
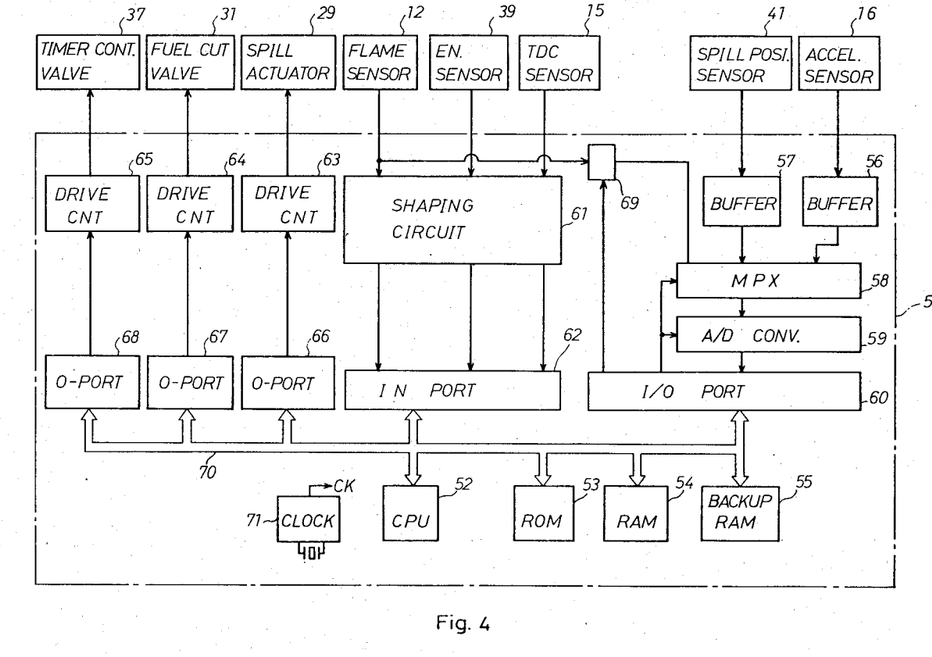
FIG. 4 is a detailed circuit construction of the electronic control unit shown in FIG. 1 according to the present invention.

FIG. 4 shows the construction of the electronic control unit 51 and the different sensors, the control valves, and actuator in the form of a block diagram. The control unit 51 comprises a central processing unit (will be referred to simply as "CPU" hereinafter) which receives and calculates the data from various sensors according to control programs, and makes various operations and processings for controlling the operations of various units. The numeral 53 indicates a read only memory (will be referred to as "ROM" hereinafter) in which control programs and initial data are stored, the reference numeral 54 indicates a random access memory (will be referred to as "RAM" hereinafter) from and into which data for entry to the electronic control unit 51 and data necessary for calculation and control are temporarily read and written, the numeral 55 indicates a backup random access memory (will be referred to as "backup RAM"), nonvolatile memory backed up by a battery to maintain, even when the key switch is turned off, the data required for the subsequent operations of the engine, the numeral 56 and 57 indicates buffers for the output signals from the accelerator opening sensor 16 and the spill position sensor 41, the numeral 58 indicates a multiplexer for selectively delivering the output signals from the sensors to CPU 52, the numeral 59 indicates an A/D converter to convert analog signal into digital one, and the numeral 60 indicates an input/output port which sends to the CPU 52 the sensor output signals supplied via the buffers 56 and 57, the multiplexer 58 and the A/D converter 59 and delivers a control signal from the CPU 52 to the multiplexer 58 and the A/D converter 59.

The reference numeral 61 indicates a shaping circuit which shapes the waveforms of the output signals from the TDC sensor 15, the flame sensor 12, and the gear speed sensor 39. The sensor output signals are directly fed to the CPU 52 from the shaping circuit via an input port 62. Furthermore, reference numerals 63, 64, 65 indicate drive circuits respectively which drive the spill actuator 29, the timer control valve 37 and the fuel cut valve 31 respectively, by the signals produced from the CPU 52 via the output ports 66, 67, and 68, respectively.

The reference numeral 69 indicates a peak hold circuit which holds the peak value of the signal from the flame sensor 12. This peak value is applied to the A/D converter 59 via the multiplexer 58, where it is converted into a digital signal and is applied to the input-/output port 60. The peak value is reset for every one cycle through the peak hold circuit 69 by a control signal issued from the CPU 52 through the input/output port 60. Also, when the integrated value and not the peak value is to be sought, an integration circuit is used instead of the peak hold circuit 69, the integrated value is applied to the CPU 52 by updating it for every one cycle according to the similar control.

Figure 5:
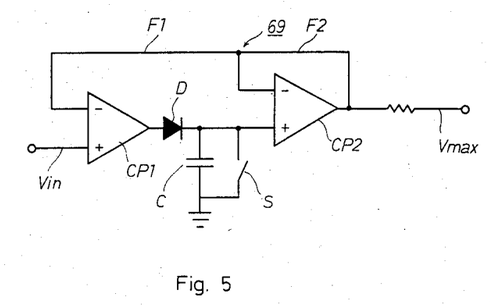
FIG. 5 is one example of the construction of the peak hold circuit shown in FIG. 4, according to the present invention.

FIG. 5 shows one example of the circuit construction of the peak hold circuit 69. The peak hold circuit comprises a first operational amplifier as a first comparator CP1, a second operational amplifier CP2 as a second comparator, a diode D, a capacitor C, a switch S, and a resistor R. In the peak hold circuit, the voltage signal $V_{in}$ from the flame sensor 12 after a photoelectric conversion is applied to the non-inverting input of the first comparator CP1. The circuit functions as follows; when the voltage signal $V_{in}$ is applied to the non-inverting input of the first comparator CP1, an output signal or voltage corresponding to the input voltage $V_{in}$ from the flame sensor 12 is produced, as it is, since the feedback signal F1 from the output side of the second comparator CP2 has not yet been produced. Accordingly, the output voltage from the first comparator CP1 is applied to the capacitor C through the diode D and the capacitor C is charged to a constant voltage level. Namely, the output voltage from the first comparator CP1 is held in the capacitor C. As a result, the charged voltage across the capacitor C is applied to the non-inverting input of the second comparator CP2, so that an output voltage $V_{max}$ is produced from the output of the second comparator CP2, which is the same as $V_{in}$ as the feedback signal F2 has not yet been produced from the output side of the second comparator CP2 at this time point. However, the output voltage is soon produced from the second comparator CP2 and it is fedback to the inverting input terminal of the first and second comparators CP1 and CP2, respectively. Accordingly, while the input voltage $V_{in}$ is increasing, the output voltage from the second comparator CP2 increases in accordance with the charge of the capacitor C. However, when the input voltage $V_{in}$ becomes decreasing, the charged voltage at the capacitor C prevents the output voltage $V_{max}$ from being decreased, thus holding the peak level of the output voltage from the second comparator CP2.

In order to reset the output voltage $V_{max}$ which is held at the peak level, the switch S is temporarily turned on by a control signal from the CPU 52 of the control unit 51 and the peak hold circuit is ready for the next cycle.

Now, turning back to FIG. 4, the remaining reference numeral 70 indicates a bus line for the passage of signals and data, and the numeral 71 indicates a clock circuit which delivers clock signals for timing the control of the CPU 52, the ROM 53, and RAM 54 at predetermined intervals, respectively.

Figure 6:
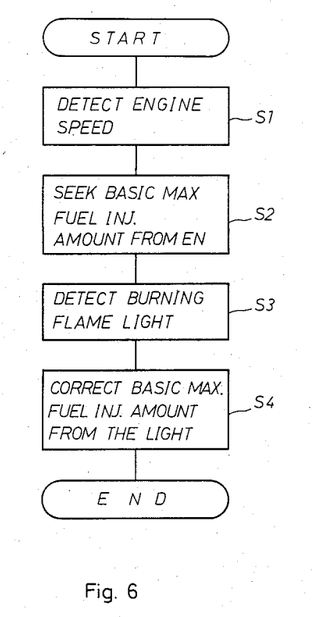
FIG. 6 shows the principal steps of the method for controlling the fuel injection amount and timing according to the present invention.

FIG. 6 shows the basic steps of operations of proceedings of the method of controlling the fuel injection amount and timing for a Diesel engine, according to the present invention.

As shown in the figure, the method according to the present invention comprises the steps of:

(S1) detecting the engine speed;
(S2) calculating a basic maximum fuel injection amount in accordance with the engine speed sought in the step S1;
(S3) detecting the intensity of the burning flame light in the combustion chamber of the engine; and
(S4) correcting the basic maximum fuel injection amount calculated in the step S2 in accordance with the intensity of the burning flame light sought in the previous step S3.

Figure 7:
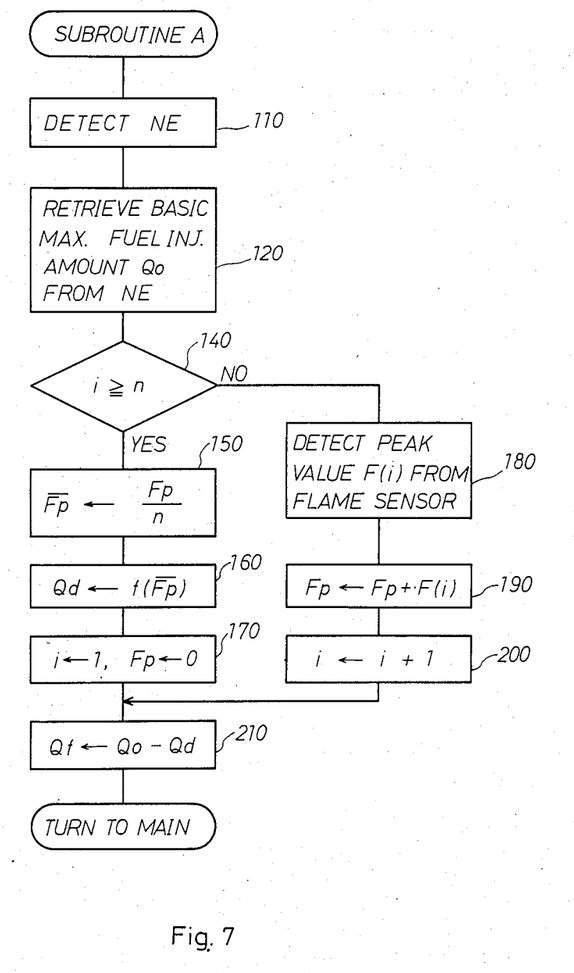
FIG. 7 shows the detailed construction of the method of controlling the fuel injection amount and timing according to the present invention.

FIG. 7 shows a program flow chart for realizing the method of controlling the fuel injection amount and timing of the engine, according to the present invention described above, with reference to FIG. 6.

Figure 8:
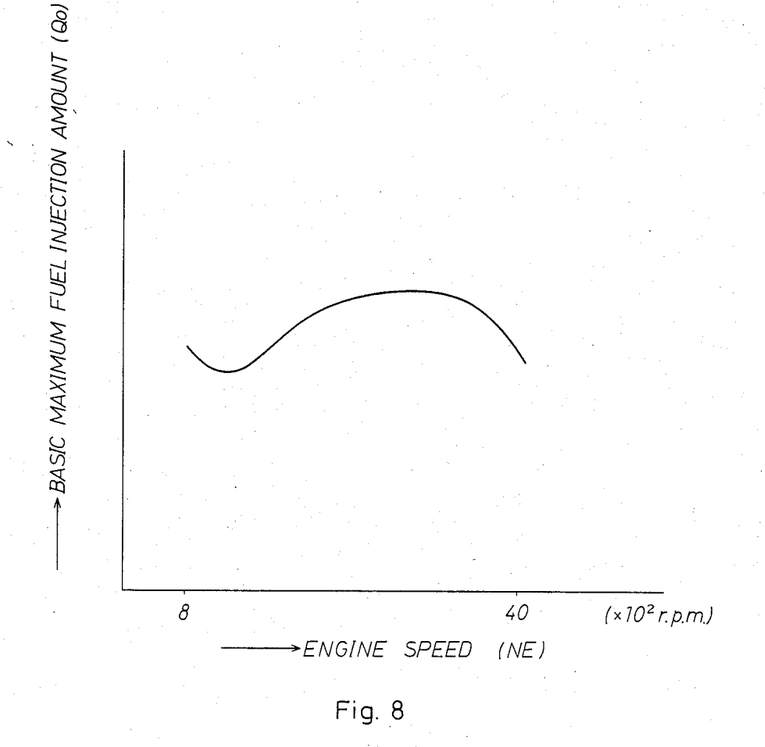
FIG. 8 is a graph of the relationship between the basic maximum fuel injection amount $Q_0$ and the engine speed NE, to be stored in the ROM as a data map.

The subroutine A, shown here is a portion of a series of the operations performed by the electronic control unit 51 and it is executed at the lapse for a predetermined time or a predetermined rotation of crank angle. In the FIG. 7 the reference numeral 110 indicates a step where the engine speed NE and other parameters are detected. The engine speed is detected by the speed sensor 39, and after that the operation moves to the step 120. In the step 120, a basic maximum fuel injection amount $Q_0$ is retrieved from a data map based on said NE. This map corresponds to a graph of the relationship between $Q_0$ and NE shown in FIG. 8. After this retrieval operation, the operation moves to the next step 140. The numeral 140 indicates a step where a decision is made if the content of a counter i is above a predetermined count n or not.

Figure 9:
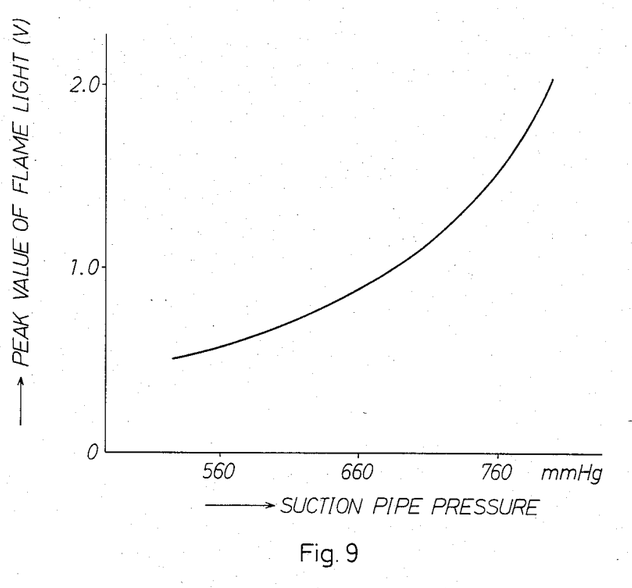
FIG. 9 is a graph of the relationship between the suction pipe pressure and the burning flame light value to be stored in the ROM as another data map.
Figure 10:
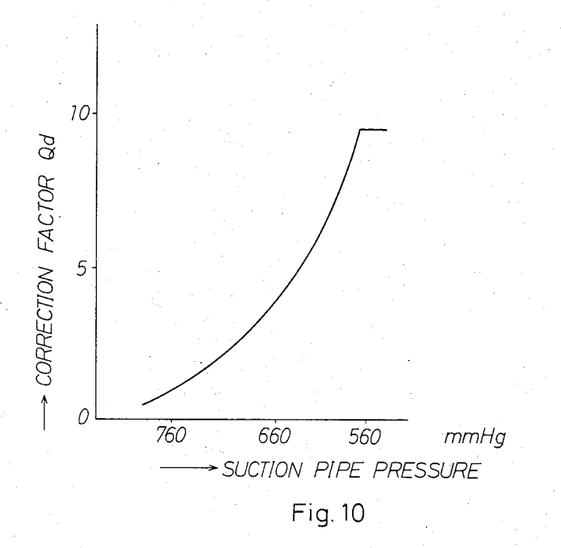
FIG. 10 is a graph of the relationship between the correction factor and the suction pipe pressure to be stored in the ROM as still another data map.

The numeral 150 is a step where the total of the peak values of the light intensity from the burning flame detected by the flame sensor 12 of n times is divided by n so as to calculate a mean value $\overline{F}_p$ of the peak values. The numeral 160 is a step in which a function $f(\overline{F}_p)$ is calculated based on said $\overline{F}_p$ value so as to calculate a correction factor $Q_d$ of the maximum fuel injection amount. The function $f(\overline{F}_p)$ is shown in FIG. 9 which shows a graph of the pressure in the suction pipe vs. the peak value of the burning flame light, and shown in FIG. 10 which shows a graph of the pressure in the suction pipe vs. correction factor $Q_d$. Also, the correction factor $Q_d$ may be determined from the maps in FIG. 9 and 10. Since the pressure in the suction pipe is nearly the same as the atmospheric pressure, the pressure in the suction pipe is taken as a parameter in place of the section pipe pressure in the engine. In this case, when the turbo-charger is used, the change in the correction factor $Q_d$ due to the suction pipe pressure becomes larger than that shown in FIG. 9.

The numeral 170 indicates a step where "1" is set in the counter i and the total peak value $F_p$ is cleared. The numeral 180 is a step where the peak value of the ith burning flame light is detected as a F(i) may be an integral value of the burning flame light, and in this case, F(i) is not only the peak value, but also the integrated value. The numeral 190 indicates a step in which peak values are added together to determine or seek the total value $F_p$. The reference numeral 200 is a step where the counter i is incremented. The numeral 210 is a step where the basic maximum fuel injection amount $Q_0$ sought in the step 120 is subtracted by the correction factor $Q_d$ calculated in the step 160 to seek the final maximum fuel injection amount $Q_f$. When the operation of the subroutine A is started in the above procedure, the step 110 is executed and the engine speed NE is detected. Next, in the step 120, the basic maximum fuel injection amount $Q_0$ is retrieved from the data map based on the engine speed NE. Then, the next step 140 is executed. In this step 140, a decision is made whether or not the value of the counter i is above a predetermined value n. However, since the operation has been just started and the main routine (not shown) has been initially set to "1", the counter i is less than the predetermined value n. Accordingly, the result of the decision becomes NO and the operation now moves to the next step 180. In the step 180, the peak value of the burning flame light in the cylinder is detected by the flame sensor 12, and the operation now moves to the next step 190 where the above peak value is added to $F_p$.

In the initialization of the main routine (not shown), the value $F_p$ is cleared. Further, in the step 200, the counter i is incremented. In the step 210, the basic maximum fuel injection amount $Q_0$ calculated in the step 120 is subtracted by the correction factor $Q_d$ to provide the final maximum fuel injection amount $Q_f$. Since the step 160 has not yet been executed, the value set in the initalization of the main routine is used as the correction factor $Q_d$ and the operation of the subroutine A1 is terminated. The final maximum fuel injection amount $Q_f$ is used as an upper limit value of the fuel injection amount in other fuel injection control subroutine not shown here.

As the subroutine A is started again, the steps 110 and 120 are executed and the operation now moves to the next step 140. In the step 140, a decision is made as to whether or not the value of the counter i is above n. Since the count in the counter i has been incremented to "2" in the previous operation, if the value n is, for example, "100", the result of the decision becomes NO and the operation now moves to the next step 180. In the step 180, the peak of the burning flame light is detected. After this operation, the program now moves to the next step 190.

In the step 190, the peak value thus calculated is added to the $F_p$ and the operation now moves to the next step 200, where the counter i is incremented. Namely, the counter is counted up to "3". In the next step 210, the final maximum fuel injection amount $Q_f$ is calculated. Then, the operation of the subroutine terminates. However, so long as the opening or depression of the accelerator pedal 17 (see FIG. 1) is in the predetermined state and the value of the counter i is less than the predetermined value n, the result of the decision in the step 140 becomes NO and detection of the peak value of the burning flame light, the addition of the peak value to $F_p$ and the increment of the counter i are repeatedly done.

When the value of the counter i becomes above n after the repetition of such operations, the decision in the step 140 becomes YES and the operation now moves to the next step 150. In the step 150, the value $F_p$ previously calculated in the step 190 is divided by n to calculate the mean value $\overline{F}_p$ of the peak values of the burning flame light. Next, in the step 160, the function f $(\overline{F}_p)$ is calculated based on the $\overline{F}_p$ to determine the correction factor $Q_d$. Then, the operation now moves to the next step 170, where "1" is set in the counter i and the total value $F_p$ of the peak values is cleared. When the step 210 is executed, the basic maximum fuel injection amount $Q_0$ calculated in the step 120 is subtracted by the correction factor $Q_d$ obtained in the step 160 to seek the final maximum fuel injection amount $Q_f$ and the operation of this routine A terminates.

With the construction of the embodiment according to the present invention, it is possible to control the maximum fuel injection amount in accordance with the burning flame light in the cylinder and also in accordance with the change in the air pressure. Since the peak value of the burning flame light of the integral value has some correlation with the atmospheric pressure in the suction pipe in this case, the maximum fuel injection amount can be controlled according to the atmospheric pressure, namely, the altitude where the engine is operating.

Furthermore, the calculation of the correction factor for the maximum fuel injection amount based on the mean value of the peak values of the burning flame light makes it possible to accurately control the fuel injection amount.

Moreover, according to the second embodiment of the present invention, the subroutine A in the first embodiment may be utilized in combination with the method of controlling the fuel injection timing utilizing the data of timing when the burning flame light is detected by the flame sensor 12.

Figure 11:
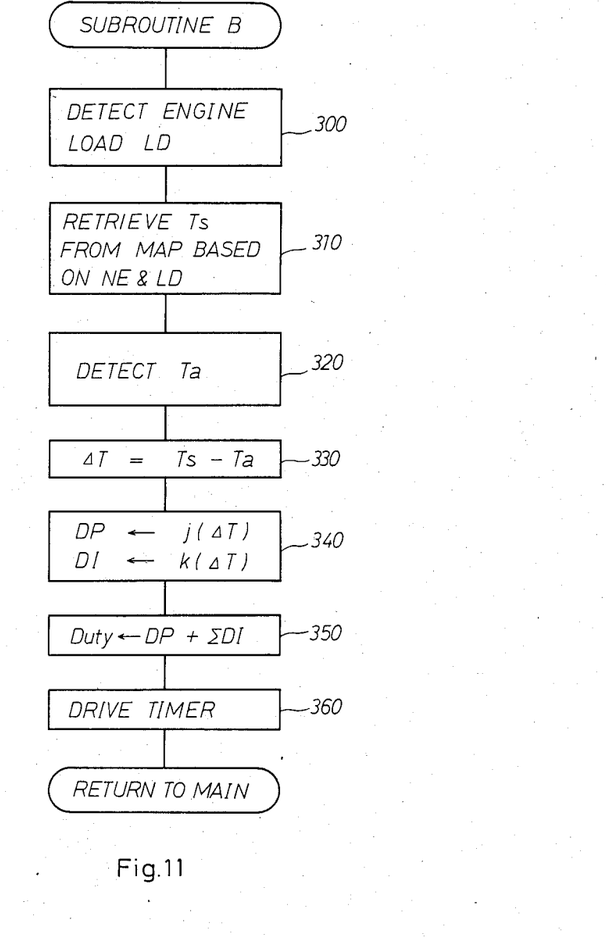
FIG. 11 shows another control program flow chart for realizing the method according to the present invention in combination with the first program flow chart shown in FIG. 7, and FIGS. 12(a) and (b) show respectively the linear relationship between the proportional term DP and the function j ($\Delta T$) and the integral term DI and the function k ($\Delta T$).

FIG. 11 shows the program flow chart of the fuel injection timing control in combination with the first embodiment, the flow chart of the subroutine B. In the figure, the reference numeral 300 indicates a step where the engine load LD is detected. In this case, the engine load LD can be detected by the output signal from the accelerator opening sensor 16. The numeral 310 shows a step where a preset ignition timing $T_s$ is retrieved from the map based on the NE and LD calculated in the step 110 of the subroutine A. The numeral 310 indicates a step where the actual ignition timing $T_a$ from the top dead center of the cylinder until the ignition is detected. The numeral 330 shows a step where the actual ignition timing $T_a$ is subtracted from the value $T_s$ to seek the difference $\Delta T$.

Figure 12:
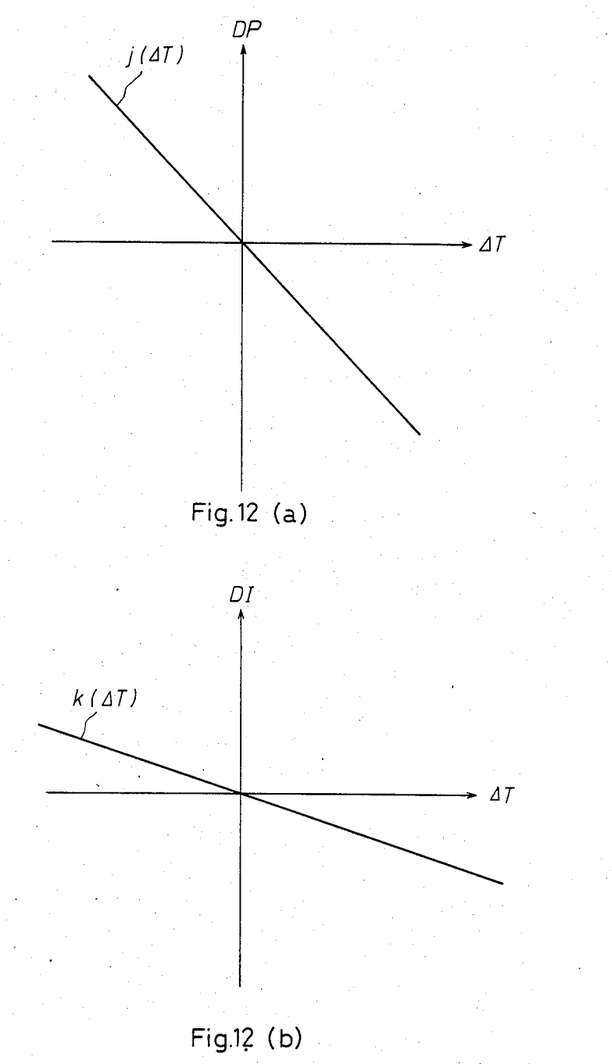

The numeral 340 shows a step where a function j $(\Delta T)$ is calculated based on the value $\Delta T$, thereby setting a proportional term DP of the feedback control function and further calculating an integral term DI of the feedback control function by the calculation of a function $K(\Delta T)$ based on the value $\Delta T$. In this case, the relationship between the proportional term DP and the integral term DI has a linear relation as shown in FIGS. 12(a) and (b), respectively.

The numeral 350 indicates a step where the value DP is added to $\Sigma DI$, the sum of integral value DI so as to calculate the duty of the control signal for the timer control valve 37. Finally, the numeral 360 indicates a step where the timer control valve 37 is driven based on the duty of the control signal so as to drive the timer to the position for a predetermined fuel injection timing.

With the above mentioned construction of the second embodiment according to the present invention, the maximum fuel injection timing can be controlled by calculating the atmospheric pressure form the peak value or integral value of the burning flame light detected by the flame sensor 12 as in the first embodiment while enabling the fuel injection timing to be feedback-controlled by a measuring the time when a control signal based on the burning flame light is produced from the flame sensor 12 according to the subroutine B, thus enabling the black smoke, knocking phenomena, emission, noises, the fuel consumption rate to be reduced. In the manner as described, both the atmospheric pressure and ignition timing can be detected by one sensor, thereby enabling the control unit and the operation thereof to be simplified as well as the weight of the unit to be reduced.

As having been described in the foregoing, the method of controlling the fuel injection amount in a Diesel engine comprises the steps of detecting the burning flame light of the fuel in the cylinder, increasing or decreasing the maximum fuel injection amount in accordance with the intensity of the light from the burning flame and precisely controlling the maximum fuel injection amount so as to adapt the altitude where the engine is running, without any mechanical action but with only picking up the intensity of the light from the burning flame, through a relatively simple apparatus.

As a secondary effect of the method according to the present invention, such data as the data corresponding to the burning flame light can be used for detecting the ignition and for controlling the ignition timing of the engine.

While the invention has been described in its preferred embodiment, it is to be understood that the words which have been used are words of description rather than limitation and that various changes and modifications within the purview of the appended claims may be made without departing from the true scope and spirit of the invention in its broader aspects.

What is claimed is:

1. A method of controlling the fuel injection for a Diesel engine which comprises the steps of:
    detecting the speed of the engine;
    retrieving a basic maximum fuel injection amount in accordance with the detected engine speed;
    determining whether a value of a counter is greater than a predetermined number;
    detecting a peak value of light intensity of a burning flame light transmitted from a combustion chamber of the engine;
    calculating a total peak value by summing the detected peak values a number of times equal to the predetermined number;
    calculating a means peak value of light intensity by dividing the total peak value by the predetermined number;
    determining a revised correction factor in accordance with the mean peak value of the light intensity when the value of the counter is greater than the predetermined number; and calculating a corrected maximum fuel injection amount equal to the basic maximum fuel injection amount minus the correction factor.

2. An apparatus for controlling the fuel injection amount for a diesel engine having a combustion chamber, said apparatus comprising:

a speed sensor for providing a speed signal indicative of engine speed;

a flame light sensor for providing a flame light signal indicative of the light intensity of a burning flame light generated within said combustion chamber;

means for holding a peak value of said flame light signal comprising a first comparator having a non-inverting terminal to which said flame light signal is applied and a second comparator having a non-inverting terminal on which a signal from the first comparator is applied, an output signal of the second comparator being fed back to inverting terminals of said first and second comparators;

means for calculating a mean value of said peak values for determinging a correction factor for a basic maximum fuel injection amount based on said mean peak value, and for adjusting the basic maximum fuel injection amount by the correction factor;

means for outputting a control signal having a duty cycle ratio corresponding to the basic maximum fuel injection amount adjusted by the correction factor; and means for receiving said control signal and dispensing an amount of fuel in response to said control signal.

3. A method as set forth in claim 1, wherein the method further comprises the steps of:

detecting the engine load;

determining a target ignition timing in accordance with the detected engine speed and the detected engine load;

detecting the actual ignition timing by the flame sensor;

calculating a timing difference between the target ignition timing and the actual ignition timing;

calculating both a proportional term of a first control function and an integral term of the first control function in accordance with first and second functions of the timing difference;

calculating a second control signal comprising a duty signal to be applied to a timer control valve so as to control the timer control valve in accordance with the sum of the proportional term and the integral term; and, operating the timer control valve in accordance with the second control signal, thereby carrying out the optimum fuel injection timing in accordance with the result of the calculations.

4. The method of claim 1, wherein the steps of calculating, the total peak value of the light intensity of the burning flame light also includes the steps of:

incrementing the coutner; and resetting the counter and the total peak value when the counter is greater than the predetermined number.

5. The method of claim 1, wherein the method further comprises the steps of;

calculating a total peak value by adding a detected peak value to the total peak value; and incrementing the counter by one.

6. The method of claim 1, wherein the method further comprises the step of:

repeating the increment of the counter until the counter reaches a predetermined number.

7. The apparatus of claim 2, further comprising:

means for producing a load signal indicative of engine load;

a timer control valve for controlling injection timing of a fuel pump in accordance with an input duty signal; and means for determining a target ignition timing in accordance with the engine speed and the engine load, for detecting an actual ignition timing, for calculating a difference between the target ignition timing and the actual ignition timing, for determining a proportional term of a feedback control function and an integral term of said feedback control function in accordance with first and second functions of said difference for generating a duty signal in response to said feedback control function, and for applying said duty signal to said timer so as to control said timer control valve in accordance with the sum of said proportional term and said integral term, thereby carrying out the optimum fuel injection timing in accordance with the result of the calculations.

* * * * *